(12) United States Patent
Wark

(10) Patent No.: US 9,465,889 B2
(45) Date of Patent: Oct. 11, 2016

(54) METHOD AND SYSTEM FOR IDENTIFYING DATA AND USERS OF INTEREST FROM PATTERNS OF USER INTERACTION WITH EXISTING DATA

(71) Applicant: Barry Wark, Boston, MA (US)

(72) Inventor: Barry Wark, Boston, MA (US)

(73) Assignee: Physion Consulting, LLC, Cambridge, MA (US)

(*) Notice: Subject to any disclaimer, the term of this patent is extended or adjusted under 35 U.S.C. 154(b) by 56 days.

(21) Appl. No.: 13/708,701

(22) Filed: Dec. 7, 2012

(65) Prior Publication Data

US 2014/0012870 A1  Jan. 9, 2014

Related U.S. Application Data

(60) Provisional application No. 61/668,426, filed on Jul. 5, 2012.

(51) Int. Cl.
G06F 17/30 (2006.01)
G06Q 10/10 (2012.01)

(52) U.S. Cl.
CPC ... G06F 17/30979 (2013.01); G06F 17/30539 (2013.01); G06F 17/30598 (2013.01); G06Q 10/101 (2013.01); G06Q 10/105 (2013.01)

(58) Field of Classification Search
CPC .................................. G06F 8/30; G06F 17/30
USPC .................................................. 707/705, 706
See application file for complete search history.

(56) References Cited

U.S. PATENT DOCUMENTS

| 5,321,833 | A | 6/1994 | Chang |
| 5,893,092 | A | 4/1999 | Driscoll |
| 5,983,214 | A | 11/1999 | Lang |
| 6,006,218 | A | 12/1999 | Breese |
| 6,029,161 | A | 2/2000 | Lang |
| 6,029,195 | A | 2/2000 | Herz |
| 6,041,311 | A | 3/2000 | Chislenko |
| 6,327,590 | B1 * | 12/2001 | Chidlovskii et al. ......... 707/734 |
| 6,345,288 | B1 | 2/2002 | Reed et al. |
| 6,347,313 | B1 | 2/2002 | Ma et al. |
| 6,430,558 | B1 | 8/2002 | Delano |
| 6,493,702 | B1 | 12/2002 | Adar et al. |
| 6,523,026 | B1 * | 2/2003 | Gillis |
| 6,535,873 | B1 * | 3/2003 | Fagan et al. .................. 707/706 |
| 6,675,197 | B1 * | 1/2004 | Satoh et al. .................. 709/204 |
| 6,928,432 | B2 * | 8/2005 | Fagan et al. .................. 707/711 |
| 7,003,515 | B1 | 2/2006 | Glaser et al. |
| 7,031,961 | B2 | 4/2006 | Pitkow et al. |
| 7,680,959 | B2 | 3/2010 | Svendsen |
| 7,716,229 | B1 * | 5/2010 | Srivastava et al. ........... 707/749 |

(Continued)

FOREIGN PATENT DOCUMENTS

FR  2845495 A1  4/2004
WO  2007147166 A2  12/2007

(Continued)

*Primary Examiner* — Baoquoc N To
(74) *Attorney, Agent, or Firm* — Ascentage Patent Law, LLC; Travis Lee Johnson; David S. Einfeldt

(57) ABSTRACT

A system and method for identifying relevant data and experts from a large data set that are relevant to a researcher, scientific project, or other analysis project using a recommendation algorithm utilizing distance metrics based on structural, annotation, and usage information associated with data elements.

20 Claims, 8 Drawing Sheets

(56) References Cited

U.S. PATENT DOCUMENTS

| | | |
|---|---|---|
| 7,801,896 B2 | 9/2010 | Szabo |
| 7,941,446 B2 | 5/2011 | Hubert |
| 7,945,668 B1 | 5/2011 | Nucci et al. |
| 8,281,307 B2 * | 10/2012 | Arnold et al. .................... 718/1 |
| 8,612,976 B2 * | 12/2013 | Arnold et al. .................... 718/1 |
| 2003/0220915 A1 * | 11/2003 | Fagan et al. .................... 707/3 |
| 2004/0172267 A1 | 9/2004 | Patel et al. |
| 2005/0049987 A1 | 3/2005 | Meek et al. |
| 2006/0293921 A1 | 12/2006 | Mccarthy et al. |
| 2007/0265870 A1 | 11/2007 | Song et al. |
| 2008/0294686 A1 | 11/2008 | Long et al. |
| 2009/0172773 A1 | 7/2009 | Moore et al. |
| 2009/0300008 A1 | 12/2009 | Hangartner et al. |
| 2009/0300547 A1 | 12/2009 | Bates et al. |
| 2010/0169340 A1 * | 7/2010 | Kenedy et al. ............... 707/758 |
| 2010/0169343 A1 | 7/2010 | Kenedy et al. |
| 2010/0306772 A1 * | 12/2010 | Arnold et al. .................... 718/1 |
| 2012/0304172 A1 * | 11/2012 | Greifeneder et al. ............ 718/1 |
| 2013/0097522 A1 * | 4/2013 | Devries ........................ 715/745 |
| 2013/0132308 A1 * | 5/2013 | Boss et al. ...................... 706/12 |
| 2014/0006414 A1 * | 1/2014 | Oikonomou .................. 707/748 |
| 2014/0010814 A1 * | 1/2014 | Benhar et al. ............. 424/136.1 |
| 2014/0058986 A1 * | 2/2014 | Boss et al. ...................... 706/12 |
| 2014/0122609 A1 * | 5/2014 | Sakata ........................... 709/204 |

FOREIGN PATENT DOCUMENTS

| | | |
|---|---|---|
| WO | 2009038822 A2 | 3/2009 |
| WO | 2010085874 A1 | 8/2010 |

* cited by examiner

USER ANNOTATION SIMILARITY

REGIONAL ANNOTATION

METHOD AND SYSTEM FOR IDENTIFYING DATA AND USERS OF INTEREST FROM PATTERNS OF USER INTERACTION WITH EXISTING DATA

CROSS-REFERENCE TO RELATED APPLICATIONS

This application claims priority under 35 U.S.C. §119 to the following U.S. Provisional patent application, of which is hereby incorporated by reference in its entirety: U.S. Ser. No. 61/684,426 filed Jul. 5, 2012.

COPYRIGHT INFORMATION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present embodiments relate generally to recommendation systems and more particularly to recommendation systems identifying domain-relevant data or domain-relevant experts.

2. Description of the Prior Art

Current recommendation systems or collaborative filtering systems exist to assist users with their media experience and choices by recommending media that may be of interest to the user. Many of these systems use metrics such as author, album, genre, general ratings by others, personal user ratings, ratings based on others who like some of the same songs as the user and so forth. Some systems have even created a database that breaks down music into components and classifies each, such as the 'Music Genome Project' discussed in U.S. Pat. No. 7,003,515. The general concept being that the 'taste' or 'flavor' of these media can be quantified in a manner to help the user identify additional media they might enjoy or have interest in hearing, seeing or reading.

These previous systems can be useful for media recommendations; however, these kinds of systems fall short in their capability when it comes to recommending or identifying relevant data in specialized domains such as scientific research. One of the challenges in these domains is that the data is often more than a single type (unlike music), thereby making it difficult to create a finite number of classifications. Furthermore, unlike previous systems where the correct classification was given by the data producers or common understanding (e.g. the genre of a movie), data-driven discovery projects may not know a priori how to correctly classify data elements. In fact, discovering the correct classification may be the explicit purpose of the project.

The need for recommender systems in discovery projects is highlighted by the challenges of large data sets. In specialized domains, the volume of data may be too much for a single analyst or decision maker to accommodate when performing their job functions. In order to manage voluminous data, it gets distributed among multiple scientists, doctors, intelligence analysts and so forth. This distribution in turn creates a new challenge, as it tends to create silos of data that lead to inefficient or incomplete analysis.

By way of example, some of these databases may include: thousands of mouse experiments containing physiological, genealogical, and genetic data for each mouse; tens of thousands of patients having similar initial findings; or millions of satellite images that share similar pixel statistics. Experts and analysts in each of these areas cannot be familiar with all of the data or, in some instances, even know of other experts/analysts in the same field.

3. Object of the Invention

There is a need to discover experts, analysts and relevant data as it pertains to a particular project such as scientific analysis, patient diagnosis, and other areas where large data sets exist.

The present embodiments described herein seek to address these needs.

SUMMARY OF THE INVENTION

Recommendation systems utilizing recommendation algorithms have been developed for identifying data or users from a large domain data set that are relevant to a particular domain expert or domain project by associating (calculating distance between) data elements based on a combination of (1) structural information associated with each data element (including type of data, domain relationships between data items, experimental subject, subject species, parameters of acquisition, sequence and timing, etc.); (2) similarity of user annotations (keyword tags, key-value metadata, region-of-interest annotations in time and/or space, etc.); and (3) usage or user interaction with those data elements (including order of interaction, data elements shared with colleagues and combinations of data in analysis products or publications).

In one embodiment a graph representation is created with data elements and users as graph vertices having edges representing the relationships between all of the data elements and users in a data set(s) based on structural, annotation, and/or usage information. In some instances, if more than one linking relationship exists between two data elements, an applied priority (or weighting) based on type and similarity of the linking relationship is established. A search algorithm then uses the linking relationship information to determine a distance between data elements and users. Finally, a recommendation algorithm uses this distance information to recommend relevant data elements and users based on a given query.

In one embodiment a user may input a query through a user interface that is linked to a processor that is configured to calculate linking relationships between data elements and nodes stored in memory, as well as calculate distance between a query and relevant data elements and users. A list of relevant data elements and users may then be returned to the user through an output device. In some embodiments the user interface and the output device are the same, while in others they are separate.

DETAILED DESCRIPTION OF THE PREFERRED EMBODIMENT

The present application provides various embodiments to identify potentially relevant data or relevant users in a large data set (or data sets) that may be distributed across multiple groups, venues, projects, persons and so forth. Some of these embodiments include utilizing a recommendation system or algorithm that has the ability to analyze similarity measures between users and data elements.

For purposes of this application a node may refer to, but is not limited to, a user or a data element. Users may be persons and in some cases other recommendation systems, machine learning systems, or analyzing algorithms. E.g. there may exist multiple recommendation systems that analyze data, and one non-human user may be more relevant over a second non-human user. Data elements include: measurements, projects, reports, analysis, charts, images, results, media, or any data having at least one of: structural, annotation, or usage information associated with the data element. The structural, annotation and usage information allows each data element in a database(s) to be linked to other nodes in a graph for purposes of quantifying a distance relationship with other data elements and users (see FIG. 6A). There may be more than one linking relationship (i.e. more than one distance measurement) between nodes.

Synthesized information discussed herein includes, but is not limited to, any new information created from one or more data elements that generally provides a reduced description of those data elements. Some examples include statistical summaries, patient diagnosis from test results, a graph or report generated from a data set, a summary, conclusion or abstract of an experiment, grouping a set of annotated data elements together, publications, some calculations, and so forth. Some of the procedural steps taken to create synthesized information include analyzing, blending, separating and recombining, reordering, or calculating of one or more data elements where domain knowledge is required to perform these procedural steps. One or more users or domain experts may be associated with creating the synthesized information.

Figure 1:
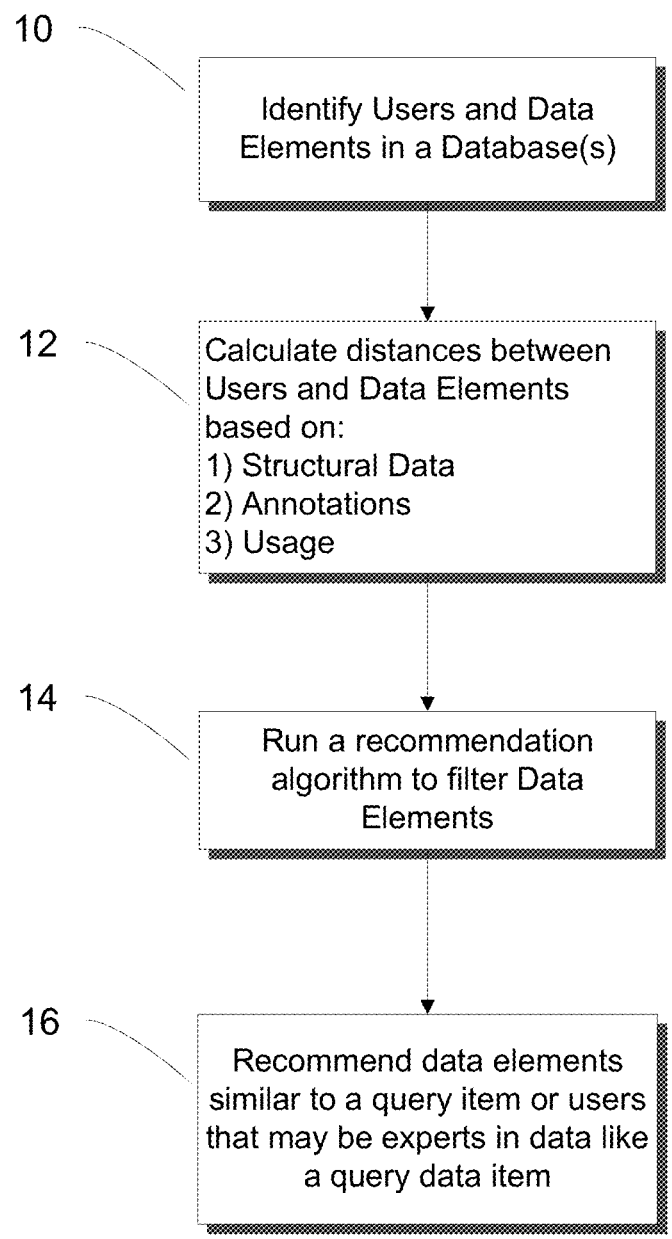
FIG. 1 illustrates a process for identifying relevant data elements and users based on a queried search.

In an embodiment illustrated in FIG. 1, first step 10 is to identify a database(s) containing a plurality of users and data elements. Users and data elements may be dispersed over multiple databases. In some instances, the database(s) may need to convert the data elements and users to have all of the structural, annotation and usage information properly associated with each. This association or conversion process may be done in the same database, a new database or performed in memory for later use. A second step 12 is to calculate distances between each of the users and data elements based on linking relationships formed from 1) 'structural' data about the conditions under which the nodes were acquired; 2) annotations associated with each of the nodes; and 3) users' usage or interaction information with the nodes. In one embodiment, a graph of nodes is created with edges linking associated nodes, such as one shown in FIG. 6A, which may assist with estimating the shortest graph traversal path between each of the nodes. After distance relationships between each of the data elements and users are generated, step 14 may be applied by incorporating the distance relationships into a recommendation algorithm to generate recommendations (step 16) of relevant nodes (users or data elements) specific to a requested query. These recommendations 16 may identify similar data elements to those presented in the query and/or they may identify potential users that may be domain experts with the type of data queried. An input or requested query may include information comprising one or more nodes. E.g. the user making the query may be considered as part of the query or a group of users along with one more or data elements.

In many of the embodiments described herein, it is preferable to use at least one computing device having a processor configured to execute the calculations to determine distance relationships and make recommendations based on a recommendation algorithm. It is anticipated in some embodiments using multiple computing devices working in a networked environment to access data elements and user information from multiple databases or storage devices. Calculations may also be distributed and performed among the multiple computing devices. Computing devices are often preferred, because they enable faster calculations, reduce storage size of data elements and user information, enable access to such information across a computer networked system and have the ability to automatically update new structural, annotation and usage information associated with each node as it occurs. In other cases, it is almost impossible to sift through the data manually and perform all the necessary similarity calculations to be used in a recommendation algorithm. The present application seeks to enable the discovery of relevant information and users in large data sets and particularly those that are scientific or research based.

The recommendation systems described herein may be utilized in a network or cloud-based system where one computing device, having a user interface, receives information (which may come by way of a browser-based interface) and transfers that information into the networked or cloud based system. The networked or cloud-based system may be comprised of a plurality of computing devices and processors having the capability to either parse out calculations amongst one or more processors, retrieve data element and user information from one or more memory locations within the networked or cloud-based system and return the queried results to one or more computing devices or output devices connected to the network or cloud-based system.

In one embodiment, a user may login to a recommending system through a user interface connected to at least one computing device. When the user enters a query into the user interface, the recommending system calculates distances between the user and any query items and all data elements and users in the system, uses the distance information in a recommendation algorithm based on the information queried and returns the results (i.e. recommended data elements and users) to the user interface or another output source. The recommendation system may also track, which of the returned results were viewed, used, discarded, annotated and so forth to improve the recommendation system.

Updates to the recommendation system may occur automatically as users and data elements are added or updated as they additions or updates occur, or information may be gathered and updated on a regular basis, such as daily or weekly.

In one embodiment, the recommendation may be configured to automatically update recommendations and intermediate calculations whenever a new node is uploaded to the database(s) or when the information (structural, annotation, usage) associated with a node is updated in the database(s).

Structural data or information associated with nodes may be related to the conditions under which the data elements (or users) were acquired, including, but not limited to: the date the node was acquired, modification date(s), experimenters associated with the node, experimental subject, experimental protocol, project type and parameters, and so forth (e.g., see FIGS. 2A-B and description below). Generally structural data associated each node is a priori knowledge in that the information associated with a node is known at the time of data collection. Structural information generally requires no or minimal study, examination, or analysis to acquire. Structural data may even include information that was synthesized by a non-user or outside entity that is associated with a node. E.g. media tracks and movies often come pre-loaded with information about author, actors, dates, genre, MPAA and other ratings, and so forth. In particular, classifying a genre could be a usage metric, but when it is pre-packaged with data elements or uploaded from an outside source (non-user) it is more akin to being structural data and has the value of such.

Annotations associated with the nodes may include user-inputted information such as keywords, key-value metadata (i.e. named attributes), ratings, and so forth. Annotations may also include regional annotations such as circling, symbols, highlighting, cropping, or other user interaction with a data element involving an action generally having a time-stamp and requiring user interpretation of the data element(s). (For example, see FIGS. 3A-D and description below)

A user's interaction or usage of nodes in a database may include, but is not limited to: order of interaction, views, incorporation in analysis, sharing with others, publishing, or recommending to the user, other interaction with the nodes, and so forth. (For example, see FIGS. 4A-5 and description below). User preference for data elements (nodes) is inferred through both explicit annotations (such as those mentioned under Annotations) and by the usage of data.

One subset of usage involves a synthesis of the data elements. For example, out of order traversal through data, spending an excessive amount of time viewing particular data, the search criteria associated with a query, incorporating data elements into a report, as a summary, calculation, citation, or sharing of particular data elements out of a larger data set, or any other distilling or synthesizing of data elements process.

Usage information associated with nodes is an important metric as it helps solve the problem of how to recommend data elements when the data elements do not come with complete classification, no classification, or the relevant features are not known. This classification or "synthesized" information, inferred from the data, is often missing from data elements in scientific, medical, financial, intelligence and other fields. Furthermore, it may be impossible to know which of the a priori obtained synthesized information is relevant.

Usage information may be critical in calculating the domain-relevant similarity between data elements because objective (e.g. structural) measures may not be sufficient to indicate similarity. By way of example, in certain large data sets there exist data elements too numerous to individually characterize or the characterizations are too generic to distinguish one data element or set of data elements from another. Satellite images often have data elements (such as pixels) that are statistically indistinguishable from other satellite images. The correct synthetic information with which to categorize satellite images is not known. As a result, expert analysts are required to review and characterize those images. This work is often partitioned among many analysts, thus creating analysts who become experts in their respective 'silos' or sub-parts of a larger data-set. However, certain intuitive information may be gathered about data elements in this larger data set when a particular analyst repeatedly uses one data element over another similar data element(s). This intuitive information that is inferred through usage, interaction or synthesis of data elements may then serve as a metric to create linking relationships.

Alternatively, expert analysts or users may be identifiable, through using the recommendation system to identify users' who have had a certain amount of interaction with certain types of data elements. One example where this may be useful is in the financial industry, which encompasses thousands of analysts, and where it may be difficult to locate which analyst has the desired familiarity (interaction) with certain data sets. Likewise, similar scenarios arise in the military, research labs, and other industries having numerous analysts. In scientific research, if a particular user often performs a similar synthesis or analysis on certain types of data elements, such as looking for particular markers among mouse data, that information may be used to identify that user as one familiar with that type of marker.

In step 12 of the embodiment above, the first two items (1, structural data and 2, annotations) may be inputs used in a system like the Netflix recommendation system. For example, on Netflix, the information about the movie (actors, directors, genre, etc.) may be considered the "structural" data, while explicit user annotations (ratings) may qualify as the second item above. However, in the highly specialized scientific space, these items alone do not provide enough information to recommend relevant data elements and/or domain experts. Adding information about users' interaction, usage, or synthesis of the data (item 3 in step 12), which is not used in the prior art, makes using the present recommendation systems—utilizing structural, annotation and usage metrics to determine distances—effective in these highly specialized domains.

The third item in step 12 (usage) may correspond to the user's interaction, usage, and/or synthesis of projects, experiments, trials, protocols, measurements, etc. As mentioned, users of data in general may expose information about their expert intuition about that data through their interaction with it. In particular, an expert user's choice in selecting and executing a synthesis of a dataset(s) discloses significant information about the semantic relationships amongst data elements incorporated into the synthetic operation. Thus, these embodiments make use of users' interaction with the data to infer relationships that users may only subconsciously recognize. For example, User A may synthesize two data elements into a database, which Users B and C later cite in subsequent reports. User A's implementation of User B's report into his/her own research, may reveal a closer relationship between A and B's research, than between A and C's research. In this example, if yet a fourth user, User D, performed research within the same domain as A, the recommendations system may be more likely to recommend User B's work over C's. Such relationship information allows the recommendation systems, disclosed herein, to make recommendations about data that a querying user has not viewed but that other users, whose interests appear to match the current user's interests, have thought were similar to items that the current user cares about.

It should be noted that previous algorithms and methods for recommendation (or collaborative filtering) systems (e.g. co-clustering) often depend on a "distance metric" for computing similarity between items that are being recommended. A distance metric based on only structural similarity and annotation fails in the domain of scientific or similarly highly structured data sets because the structural information and annotations used by domain experts are not sufficient to distinguish amongst the collection of data elements. Data elements may be structurally similar (e.g. all satellite images or DNA microarray experiments) and the diversity of annotations used by experts in a complex domain may not have simple correspondence as in the case of media ratings (an expert may use the same annotation with different meaning in different projects). By incorporating additional information into the chosen distance metric (usage information), the embodiments described herein disclose a novel strategy for calculating distance that may be applied to large, complex data sets more effectively than previous methods.

Calculating Similarity Distances

As mentioned above, a number of similarity metrics may be used to calculate distances between nodes (e.g. between a user and a data element, between a user and another user, or between a first data element and a second data element). After these distances are calculated a collaborative filtering (e.g. co-clustering) or other similar algorithm may then be used to recommend relevant data items sought by the user (discussed below). It is important to note that one or more similarity metrics may be used and each metric may be weighted uniquely to help make relevant suggestions.

The similarity metrics used herein are generally broken down into three category types including: structural, annotation and usage. Distance between two nodes may be estimated by using the available similarity metrics to calculate distance between each pair of intervening nodes and incorporating these similarities algorithmically (e.g. by summation of the shortest path distance). Some of the similarity metrics used include: meta-data similarity, annotation similarity, collaboration similarity, analysis similarity and so forth.

Figure 2A:
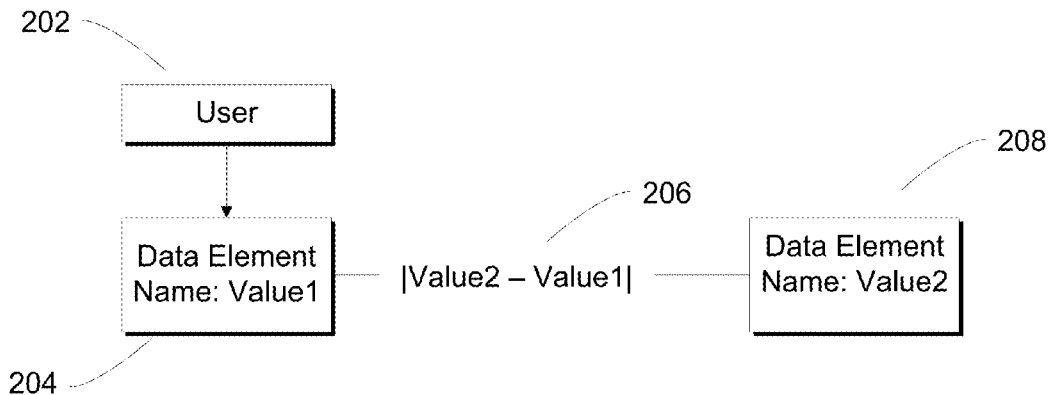
FIGS. 2A-B illustrates various implementations of using structural similarity to establish relationship or distance.
Figure 2B:
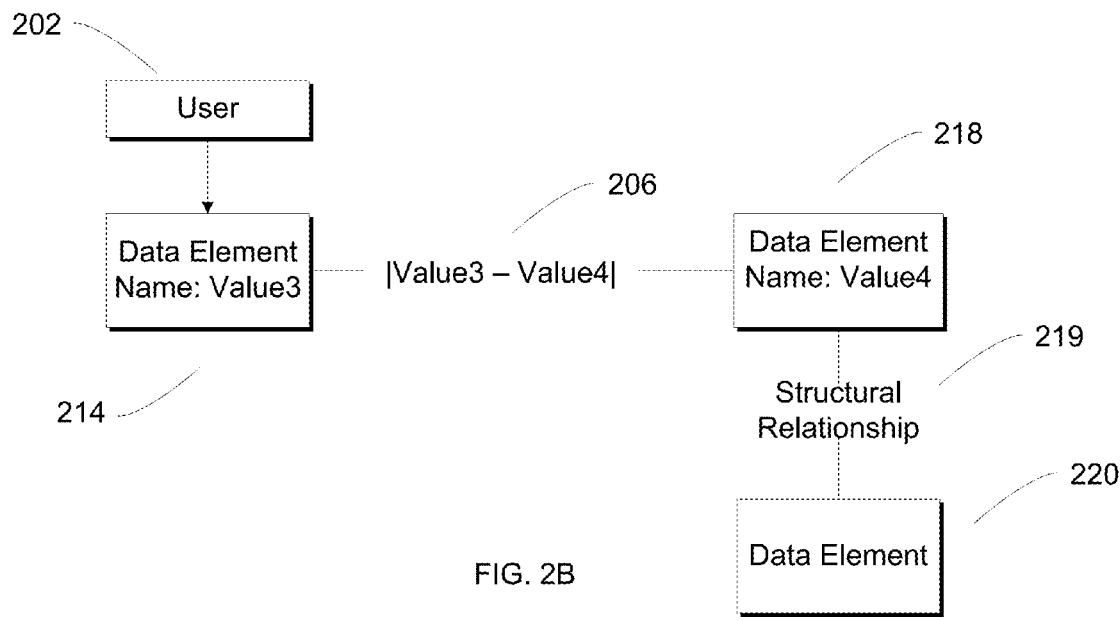

FIGS. 2A-B illustrate two examples of computing distance using STRUCTURAL SIMILARITY between a user and a data element not directly associated with the user. The first example in FIG. 2A shows the user 202 directly linked or associated to data element 214. Through performing a structural similarity analysis 206, which compares a certain named attribute (having value 1) associated with 204 with a related named attribute (having value 2) associated with data element 208, user 202 may now be linked to data element 208. This structural similarity analysis may be based on similarity of attributes, keywords, dates, types, experimenters, project types, protocols, or groups. The structural similarity analysis may compare direct or exact matches such as data element 204 having been tagged "red" and data element 208 having also been tagged "red." This analysis may also be based on similarity of type or genre and species e.g. 'red' and 'pink' or 'red' and 'color.' These comparisons or calculations may also be based on relative value of semantically related metadata (e.g. experimental protocol, protocol parameter, data type, etc.). It should be noted that named attributes, keyword tags, etc. may be considered an annotation if done by a user, or structural information if acquired in an a priori manner into the database or system. Thus, the structural similarity analysis 206 shown in FIG. 2A could similarly be applied in an annotation similarity analyses.

In another example shown in FIG. 2B, user 202 and data element 220 are linked together in part by a structural similarity analysis 206 between data elements 214 and 218 and a structural relationship 219 between data elements 218 and 220. The structural similarity analysis may again be based on similarity between a named attribute (having value 3) of 214 and named attribute (having value 4) of 218. The structural relationship 219 may be one where data element 218 is part of trial block with data element 220 or where 218 is a subset of 220. Each of the types of structural analysis or structural relationship similarities may be weighted differently when incorporated into a recommendation algorithm.

Figure 3A:
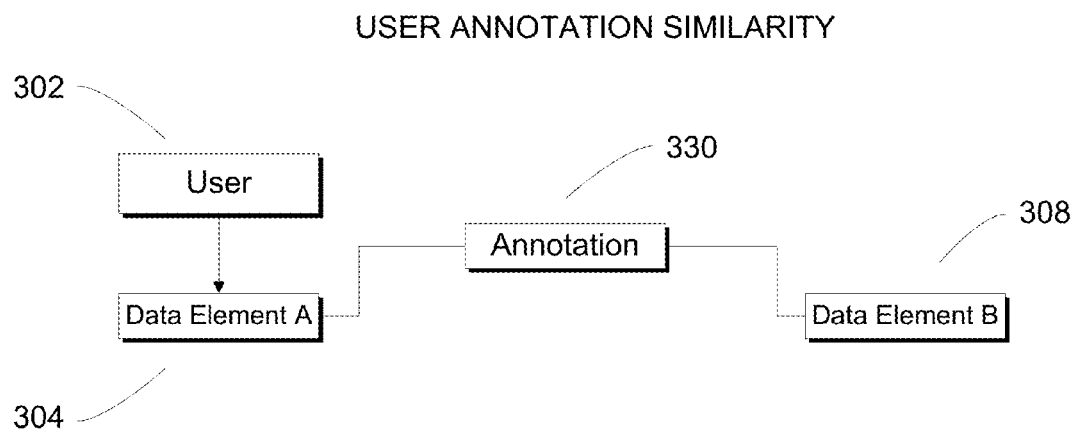
FIGS. 3A-B illustrate various implementations of using annotation similarity to establish relationship or distance.
Figure 3B:
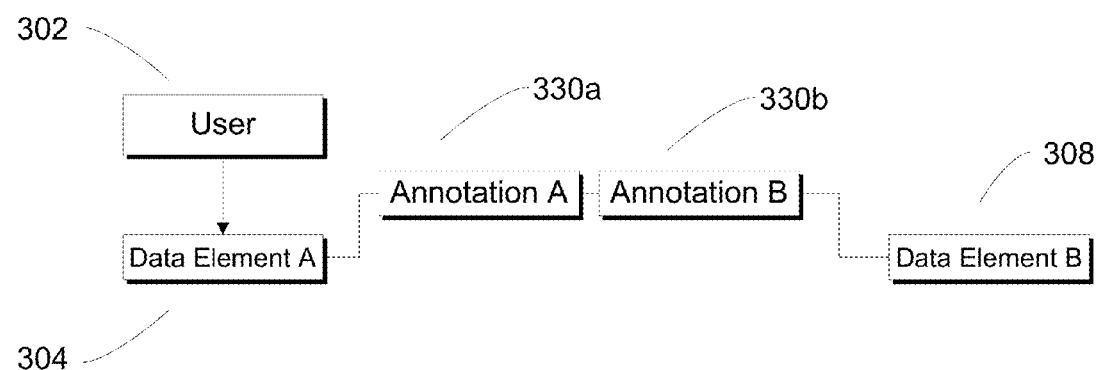

As discussed, annotations are a second type of information associated with nodes by which the present application uses to calculate distance relationships between nodes. FIGS. 3A-B illustrate visual diagrams of using annotation similarity to calculate distance between objects (user to user, user to data element, data element to data element, etc.). Annotations may be notations made that associate two items together such as a common or related keyword, or a key-value pair with related key(s). For example, in FIG. 3A, user 302 is associated with data element 304 that is linked with data element 308 through an annotation 330. Another example shown in FIG. 3B links User 302 to data element 308 by comparing annotations 330a and 330b. This annotation similarity analysis may include semantic similarity. Even though the annotations used may not have directly linked the user 302 with data element 308 the similarity in annotation 330a, applied to data element 304, and annotation 330b applied to or associated with data element 308 are sufficient to enable a distance calculation to be performed between user 302 and data element 308.

Figure 3C:
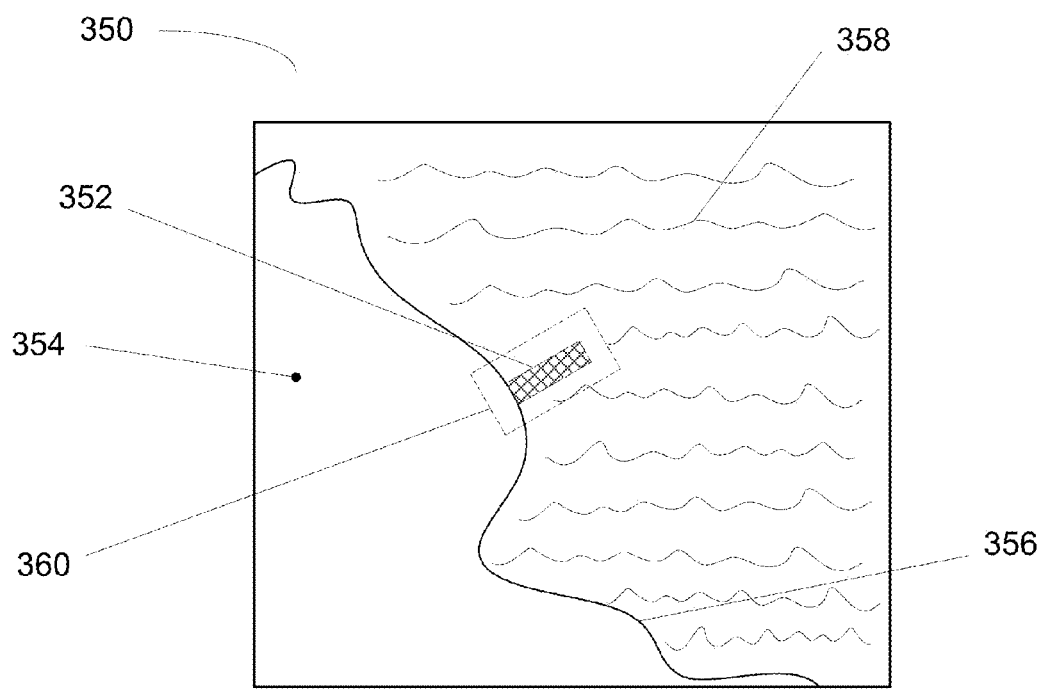
FIGS. 3C-D illustrate various examples of regional annotations.
Figure 3D:
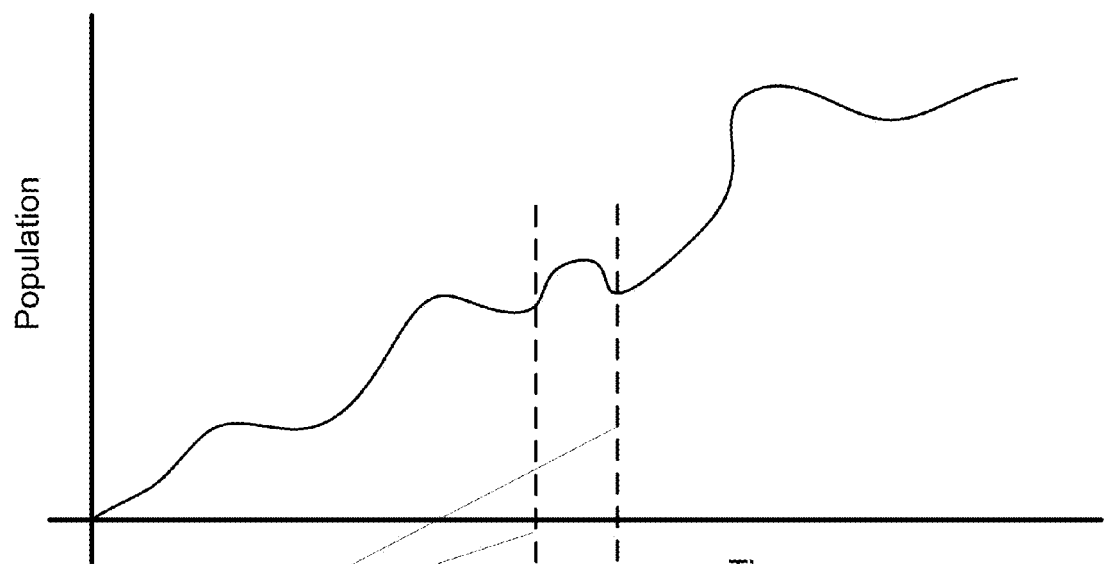

FIGS. 3C-D illustrate some types of regional annotations. For example, a picture 350 in FIG. 3 showing a land portion 354, shoreline 356, water 358 and dock 352, has a regional annotation 360, shown as a dashed box around the dock 352. These types of regional annotations may be manually (and in some cases automatically) inserted or added to data elements, such as shown in picture 350. FIG. 3D, illustrates another type of regional annotation 380 marking off a portion of the time vs. population graph 370 inferring or noting a particular focus on a portion of the graph. Generally annotations focus on marking, recording or otherwise labeling a data element as opposed to synthesizing information, which is a type of usage information.

Figure 4A:
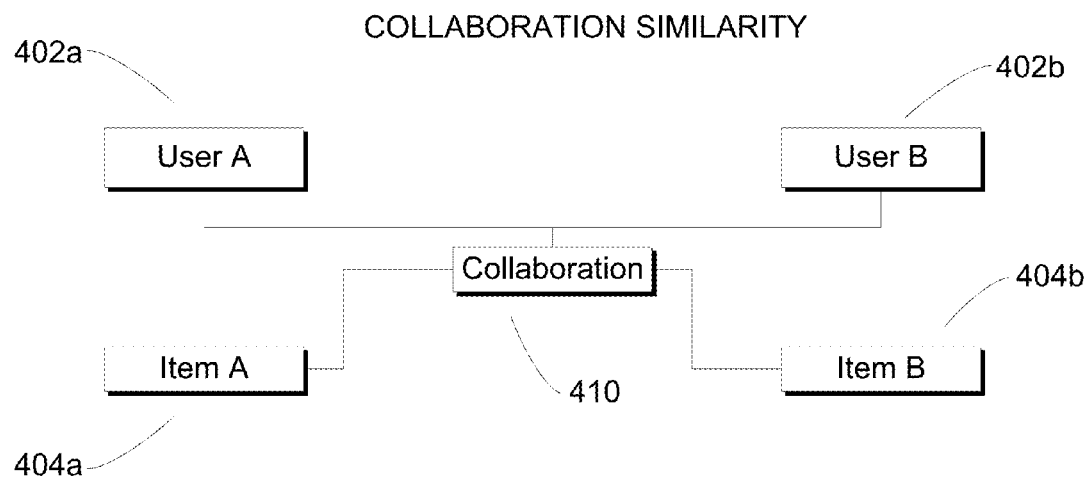
FIGS. 4A-B illustrates various Collaboration similarity analysis to establish relationship or distance.
Figure 4B:
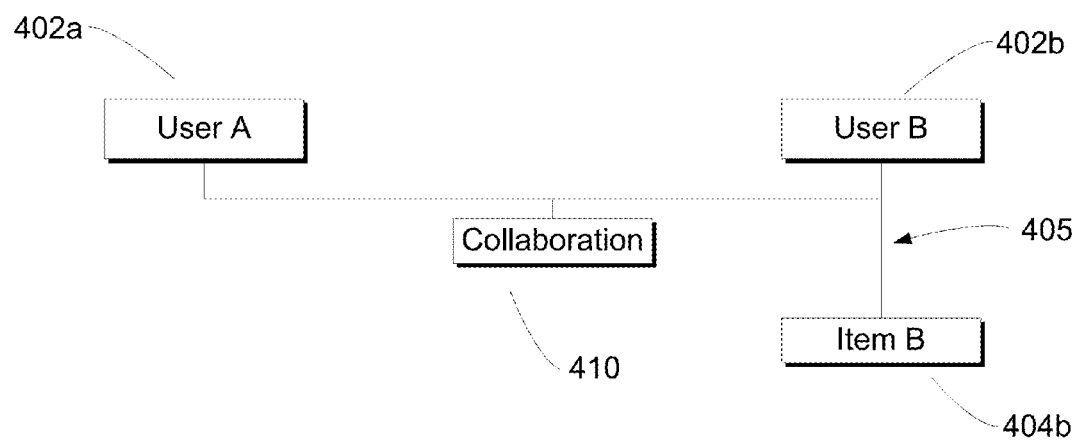
Figure 5:
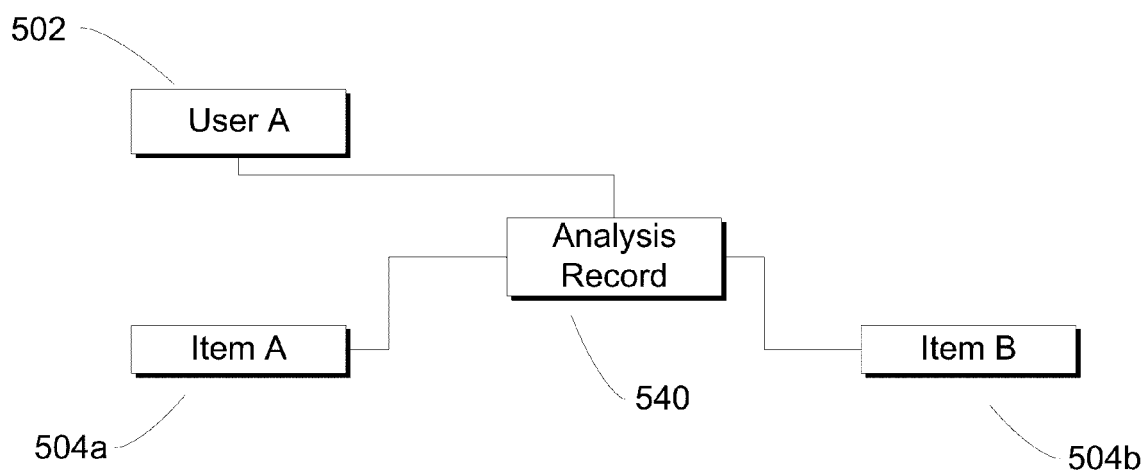
FIG. 5 illustrates using an analysis product to establish relationship or distance.

Examples of the third type of information (usage or user interaction) associated with nodes and used to calculate distances are shown in visual diagrams FIGS. 4A-5. FIGS. 4A-B illustrate some kinds of COLLABORATION SIMILARITY as one type of user interaction with data elements to calculate distance. In FIG. 4A, user 402a and data element 404b are linked together through a collaboration 410 that occurs between multiple users and where at least one data element 404b was shared. FIG. 4B, links user 402a and data element 404b together through a collaboration 410 that occurs between multiple users (402a and 402b) where an item 404b is associated 405 with the collaborating user 402b and that is not necessarily shared in the collaborative process 410.

FIG. 5 illustrates a visual diagram of showing a relationship between user 502 and a data element 504b through an analysis record 540 (or analysis product, one type of synthesized data) that contains data element 404b. User 502 through performing an analysis or type of analysis may be linked to several data elements (504a and 504b). Another example, not shown, is linking a user indirectly to a data element that had a similar type of analysis performed on that data element or group of data elements where the user did not directly perform the analysis, but would understand data elements that had been analyzed by a similar process or method. In this case, similarity between analysis records would be established by the same three similarity metrics described herein.

Figure 6A:
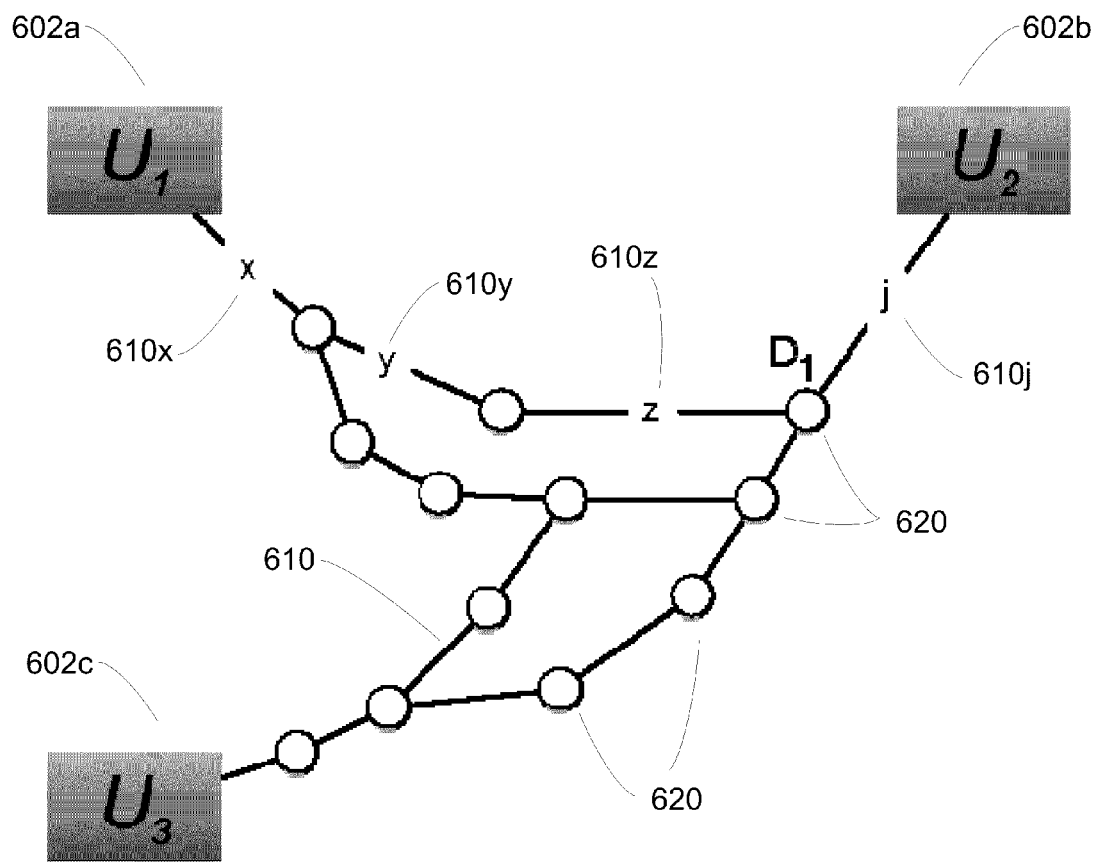
FIG. 6A is representative of a graph of users and data elements with edges based on structural, annotation and usage information.

As previously mentioned, all of these types of distances or relationships between nodes may be presented in a graph (or representation) such as one shown in FIG. 6a. Here users 602a, b and c are linked to each other through various data elements 620 that are each linked to each other through at least one of the three types of similarity relationships shown in step 12 of FIG. 1 with the linking distance defined by the relevant similarity metric. For example, user 602a is linked to data element D1 by a linking relationship 610x, 610y and 610z each linking other data elements 620 to D1. User 602b and user 602a have a linked relationship through D1, though as shown, user 602b appears to have a single or more direct link (through linking relationship 610j) to D1 than 602a. Once a representative graph is created of all of the users and data elements in a system or database a table may be created, such as the one shown in FIG. 6B, which lists all of the users, data elements and the summation of linking relationships' distances. The table in FIG. 6b may then be sorted and rearranged in a number of ways, such as through a co-clustering algorithm to then make recommendations to relevant users or data elements based on the information queried.

Figure 6B:
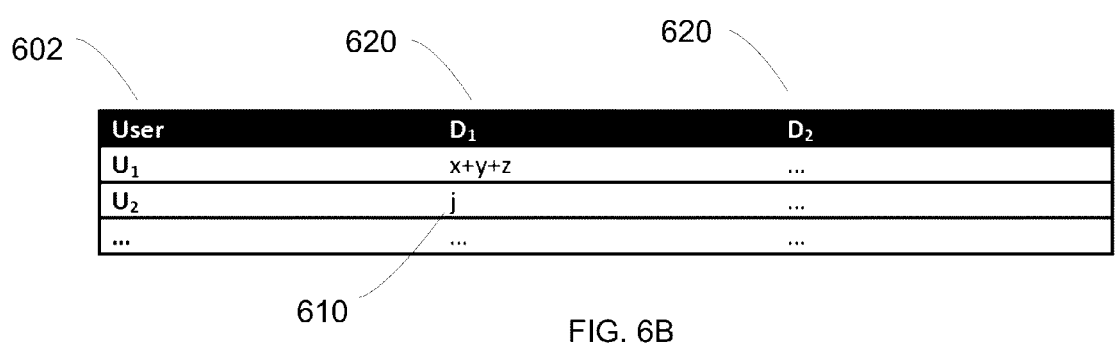
FIG. 6B is a representative table of distances from each user to each data element, created from a shortest path search of a graph, such as one in FIG. 6A.
Figure 6C:
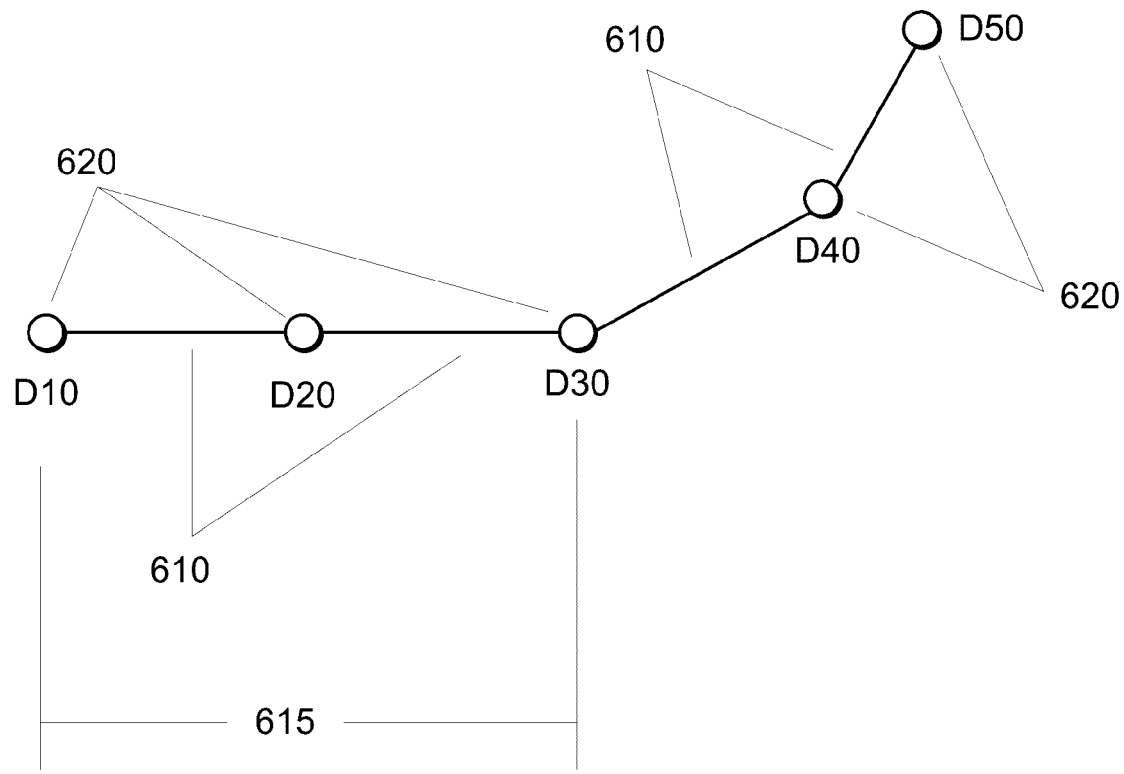
FIG. 6C illustrates distance between multiple data elements in a graph as a summation of the linking relationships' edge distances.

In FIG. 6C, the distance 615 between data elements D10 and D30 is comprised of two linking relationships 610; the first linking relationship between D10 and D20, and the second between D20 and D30. If distance was being calculated from D10 to D50, the total distance would be comprised of four linking relationships in this linear route of traversal graph shown in FIG. 6C. Generally, it is ideal to pick the 'shortest' path of linking relationships 610 between two data elements when returning relevant information. The factors determining, which linking relationship is to be shorter or rather given more importance over another type of linking relationship may be updated and modified to improve the recommending systems described herein.

Figure 6D:
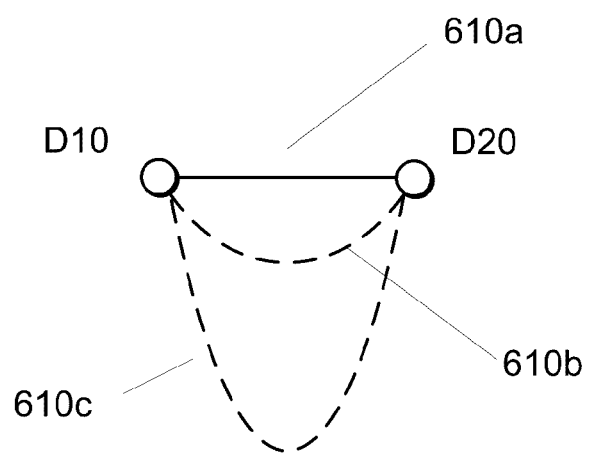
FIG. 6D illustrates the concept of having multiple linking relationships (edges) between two data elements.

As mentioned, FIG. 6D illustrates how there may be multiple linking relationships 610 between two data elements D10 and D20. For example, linking relationship 610c may be based on structural similarity between D10 and D20, while 610b may be based on Annotation similarity and 610a based on a usage. Each of the linking relationships may have a different 'length', 'distance' or importance. In some embodiments, certain similarity metrics may be weighted (up or down) by type. For example, similarity of dates created may not be as relevant as data elements created by a particular user and therefore could be weighted accordingly when determining which linking relationship is the shortest or most important. The recommendation algorithms used herein may be configured to assign various values to each similarity metric used to determine a linking relationship and then in turn create results based on the shortest paths between data elements and users.

In some instances pockets or islands of closely linked nodes are connected to other pockets or islands of nodes by one or two linking relationships. Those one or two connections at times may be sufficient to help the person querying the system to help locate other relevant islands or pockets that otherwise may have been difficult to isolate.

As mentioned, many types of recommendation systems including collaborative filters or co-clustering algorithms depend on the existence of a distance metric. Through using some or all of the distance metrics described in step 12 of FIG. 1, with examples shown FIGS. 2-5, an interested person may more readily discover other experts in their field and data that may be of relevance to them or a project they or working on.

Recommendation System

The system may operate as a single recommendation algorithm. The distance metric algorithms incorporating the user interaction with data are an important component of the recommendation systems described herein and particularly those used in the scientific fields. It should be noted that this type of recommendation system that incorporates user interaction with data may be used in a number of recommendation type systems.

The details of which items of usage are collected and a specific algorithm for combining the forms of collected information (structural, annotation, usage/interactive) may be modified without changing the basic embodiments of using the combination of these items to measure similarity of data elements. More radically, the information (structural, annotation, usage/interactive) used to compute similarity may be completely changed as long as the replacing algorithm successfully recommended items of interest to the user from the data set.

Recommendation algorithms are generally referred to as "recommender systems". "Collaborative filtering" is one generic implementation, and "co-clustering" a specific algorithm for collaborative filtering.

In one embodiment the recommendation algorithm requires producing a m×n adjacency matrix D for n data elements d and m users u in the database (FIG. 6B). The value of $D_{i,j}$ is the distance between user $u_i$ and item $d_j$. After building a graph of connections between data elements (including users), it is important to find the shortest graph distance between each user and each data element. Many algorithmic solutions are known for finding shortest graph distance, often known as the traveling salesman problem. In one implementation, the A* ("A-star") algorithm, first described by [Hart, P. E.; Nilsson, N. J.; Raphael, B. (1968). "A Formal Basis for the Heuristic Determination of Minimum Cost Paths". IEEE Transactions on Systems Science and Cybernetics SSC4 4 (2): 100-107. doi:10.1109/TSSC.1968.300136] uses a best-first search to find the lowest cost path between a starting graph node and the destination node, y. The order of node traversal is defined by a cost-plus-heuristic function:

$$f(x) = g(x) + h(x)$$

for a given node x, cost function g(x) (i.e. the total edge distance from the starting node to the current node x), and admissible heuristic function h(x) of the estimated cost from x to the destination node. Some of these heuristic functions, include using:

$$h(x) = \begin{cases} 0 & \text{if } x \text{ and } y \text{ have the same owner} \\ 1 & \text{if } x \text{ and } y \text{ have a different owner} \end{cases}$$

$$h(x) = \begin{cases} \left| \dfrac{x_{insertion\ date} -}{y_{insertion\ date}} \right| & \text{if } x \text{ and } y \text{ have the same owner} \\ \left| \dfrac{x_{insertion\ date} -}{y_{insertion\ date}} \right| + 1 & \text{if } x \text{ and } y \text{ have a different owner} \end{cases}$$

Both of these heuristics capture the intuition that the distance must be shorter between elements with the same owner, and for elements that represent data collected more closely in (calendar) time.

Note, the application is not limited to these particular choices of h(x).

Co-Clustering

Given an m×n matrix, co-clustering (also known as bi-clustering) generates co-clusters, a subset of rows that are similar across a subset of columns or vice versa.

For purposes of this application, one embodiment starts with an m×n adjacency matrix D for n data elements d and m users u in the database (FIG. 6B). The value of $D_{i,j}$ is the distance between user $u_i$ and item $d_i$.

Here the algorithm for computing the co-clusters of D using Information-theoretic co-clustering [Dhillon, I. S., Mallela, S., & Modha, D. S. (2003). Information-theoretic co-clustering. Presented at the KDD '03: Proceedings of the ninth ACM SIGKDD international conference on Knowledge discovery and data mining, ACM Request Permissions. doi:10.1145/956750.956764]. This algorithm treats the (normalized) D as a joint distribution over two random variables (X and Y in the description below) that have as their domain the rows and columns of D respectively. The goal is to produce disjoint clusters that minimize the loss in mutual information from the original joint distribution to the cluster assignments (i.e. where the cluster assignments capture information in the relationship between X and Y). Other co-clustering algorithms may produce "soft" or non-disjoint clusters. In fact, heuristics for soft co-clustering using similar techniques are known, though they have fewer algorithm guarantees than the hard partitioning version shown here. There's nothing that limits the present process to disjoint cluster-producing algorithms.

Upper-case letters (e.g. X and Y) may represent random variables, lower-case letters (e.g. x and y) are instantiations of the corresponding random variable, and "hatted" letters denote values associated with clusters ($\hat{x}$ is the random variable derived from the clustering of X and $\hat{x}$ is a cluster). Probability distributions are denoted p and q.

We seek to produce a pair of partition functions that map $X \to \hat{X}$ and $Y \to \hat{Y}$ such that $I(X; Y) - I(\hat{X}; \hat{Y})$ is minimized.

We define a probability distribution $q(x,y)=p(\hat{x}, \hat{y})p(x|\hat{x})p(y|\hat{y})$, where $x \in \hat{x}$ and $y \in \hat{y}$. [1] shows that $I(X; Y) - I(\hat{X}; \hat{Y}) = D(p(X,Y)\|q(X,Y))$.

The algorithm is as follows, reproduced from [1]:
Input: the joint probability distribution p(X, Y)(e.g. the normalized matrix D), k the desired number of row clusters and l, the desired number of column clusters.
Output: The partition functions $C_X^\dagger$, $C_Y^\dagger$.
1. Initialization: Set t=0. Start with some initial partition functions $C_X^{(0)}$ and $C_Y^{(0)}$. Compute $$q^{(0)}(\hat{X},\hat{Y}), q^{(0)}(X|\hat{X}), q^{(0)}(Y|\hat{x}), 1 \le \hat{x} \le k.$$

2. Compute the row clusters: for each row x find the new cluster index $$C_X^{(t+1)}(x) = \mathrm{argmin}_{\hat{x}} D(p(Y|x)\|q^{(t)}(Y|\hat{x})).$$

Ties are resolved arbitrarily. Let $C_Y^{(t+1)} = C_Y^{(t)}$.
3. Compute distributions $$q^{(t+1)}(\hat{X},\hat{Y}), q^{(t+1)}(X|\hat{X}), q^{(t+1)}(Y|\hat{Y}) \text{ and } q^{(t+1)}(X|\hat{y}),$$
$$1 \le \hat{y} \le l.$$

4. Compute column clusters: For each column y, find its new column index as $$C_Y^{(t+2)}(xy) = \mathrm{argmin}_{\hat{y}} D(p(X|y)\|q^{(t+1)}(X|\hat{y})).$$

Ties are resolved arbitrarily. Let $C_X^{(t+2)} = C_X^{(t+1)}$.

5. Compute distributions $$q^{(t+1)}(\hat{X},\hat{Y}), q^{(t+1)}(X|\hat{X}), q^{(t+1)}(Y|\hat{Y}) \text{ and } q^{(t+2)}(Y|\hat{x}),$$
$$1 \le \hat{x} \le k.$$

6. If the change in the objective function $$D(p(X,Y)\|q^{(t)}(X,Y)) - D(p(X,Y)\|q^{(t+2)}(X,Y))$$

is "small" (e.g. less than $10^{-3}$), stop and return $C_X^\dagger = C_X^{(t+2)}$ and $C_Y^\dagger = C_Y^{(t+2)}$. Otherwise, set t=t+2 and go to step 2.

Co-Clustering Algorithm Names

There are many co-clustering algorithms available including: "block clustering", "Coupled Two-Way Clustering", "Interrelated Two-Way Clustering", and Information theoretic co-clustering. Algorithm implementations that may be distributed across a networked cluster of computers include CRD and DisCo, the latter of which may be used with Information-theoretic co-clustering.

The present application is not dependent on a particular recommendation algorithm used. In fact, it may well be expected to update recommendation algorithms as researchers publish better performing algorithms. It is also within the scope of this application to change, modify or improve the information used in each of the three types of distance metrics described to create linking relationships between nodes. The examples above used to describe structural, annotation and usage linking relationships are by way of example as they are kinds of information included in each and not intended to be limiting. Through updating terms within those three distance metrics as well as the algorithm for combining and calculating distance between nodes it is well anticipated to optimize the system to be more efficient and/or effective for measuring distance between scientific data elements. Some of the updating of terms may include incorporating other forms of user interaction metrics that fall within the scope of usage, but may have not been explicitly stated or initiated, but incorporated later on. Likewise, additional terms that fall within the scope of structural or annotation information may also be updated.

Some of the intended uses for the recommendation system and methods described herein are for scientific data among academic and commercial basic and applied science researchers, medical data used amongst medical professionals, intelligence data used by intelligence analysts and other data used by analysts to perform efficient and effective analysis as pertaining to each individual area of interest or concern.

The present application may also be used in any situation in which users richly interact with a data set. For example, if a music service allowed users to produce mixes of samples from the items for sale on the music service, the information about users' choice of samples to include in their mixes, the order they chose those samples, etc. (i.e. user interaction data with items in the data set) could be used to improve the recommendations of the music service.

The above description is merely illustrative. Having thus described several aspects of at least one embodiment of this invention including the preferred embodiments, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed:
1. A computer-based recommendation system comprising:
a user interface connected to at least one processor; and at least one set of memory for storing data element information, user information, and computer readable instructions that, when executed by the processor, cause the processor to perform the steps of:
  a. receiving a user input query from the user interface;
  b. calculating a distance between each data element and user based on;
    i. similarity of structural data associated with each data element,
    ii. similarity of annotation information associated with each data element, and
    iii. usage information associated with data elements,
  wherein at least some of the structural data is selected from a list comprising: type of data, domain relationships between data items, experimental subject, subject species, parameters of acquisition, sequence or timing,
  wherein at least some of the annotation information is selected from a list comprising: keyword tags, key-value metadata, region-of-interest annotations in time and/or space, or user-inputted information, and
  wherein at least some of the usage information is selected from a list comprising: order of interaction, views, incorporation in analysis, sharing with others, publishing, recommending to the user, or user interaction with the data elements;
  c. inputting the calculated distances between each data element into a recommendation algorithm to identify data elements or users based on the query input, wherein the recommendation algorithm is based in part on the magnitude of the calculated distances; and
  d. outputting a list of recommended data elements or users based on the query input.

2. The system of claim 1, further including the step of updating the calculated distances based on new or updated data element and user information that is uploaded to the at least one set of memory.

3. The system of claim 1 wherein the recommendation algorithm performs a clustering or co-clustering step.

4. The system of claim 1, wherein the usage information is synthesized information.

5. The system of claim 1, further configured to track and update usage information.

6. The system of claim 1, wherein calculating distance includes a weighting factor based on the type of structural, annotation, or usage information.

7. A computer implemented recommendation method comprising the steps:
  creating a database comprising multiple users and data elements represented by nodes, each node in the database having a structural, annotation, and usage field associated therewith;
  determining distances between each node of the database based on the structural, annotation, and usage field for each node,
    wherein at least one information set for the structural field is selected from a list comprising: type of data, domain relationships between data items, experimental subject, subject species, parameters of acquisition, sequence or timing,
    wherein at least one information set for the annotation field is selected from a list comprising: keyword tags, key-value metadata, region-of-interest annotations in time and/or space, or user-inputted information,
    wherein at least one information set for the usage field is selected from a list comprising: order of interaction, views, incorporation in analysis, sharing with others, publishing, recommending to the user, or user interaction with the data elements;
  calculating a distance between the nodes and an input query, the distance being a function of the determined distances based on the structural, annotation, and usage field for each node, and wherein the step of calculating the distance includes application of a weighting factor;
  selecting at least one data element or user based on the magnitude of the calculated distance to the input query; and
  outputting to a display the selected data element or user.

8. A computer-based method for identifying a domain expert comprising the steps of:
  receiving from a user, into a terminal connected to a database and a processor, an initial query related to a research subject;
  identifying multiple data elements and users associated with the database, wherein each data element and user is represented by a separate and distinct node;
  determining using a processor a distance between each node based on:
    1) similarity of structural data associated with each node,
    2) similarity of annotations information associated with each node, and
    3) usage information associated with data elements;
  determining using the processor a distance between comparing the initial query to the nodes of the large database based on weighted:
    1) structural data information,
    2) annotation information, and
    3) usage information; and
  outputting a recommendation node of a domain expert, based on the magnitude of the weighted distance step, to an output device.

9. The method of claim 8, wherein structural data is based in part on conditions under which nodes were acquired.

10. The method of claim 8, wherein annotations may include: keywords, key-value metadata, notes, ratings, circling, symbolic marking, or highlighting.

11. The method of claim 8, wherein usage information is synthesized information.

12. The method of claim 11, wherein the synthesized information is obtained from the identified users.

13. The method of claim 8, wherein the usage information is obtained from the identified users.

14. The method of claim 8, wherein the recommendation system may be configured to mask data elements added by an inquiring user.

15. The method of claim 8, wherein the initial query is the user and is triggered by the user logging in.

16. The method of claim 15, further including automatically updating structural, annotation and usage information in the at least one database.

17. The method of claim 8, wherein the recommendation system is comprised of at least one recommendation algorithm.

18. The method of claim 17, wherein the recommendation algorithm performs a clustering or co-clustering step.

19. The method of claim 8, wherein a graph representation is created for use with the distance calculation.

20. The method of claim 19, wherein a graph search algorithm is used to calculate distance from the graph representation.

\* \* \* \* \*